H. WELCH.
Car Starter.

No. 104,673.

Patented June 21, 1870.

Witnesses:
F. Lehmann
C. L. Evers.

Inventor:
Hilyard Welch.
per Alexander Mason
Atty

United States Patent Office.

HILYARD WELCH, OF SCHUYLERSVILLE, NEW YORK, ASSIGNOR TO AMOS M. SALISBURY, OF SAME PLACE.

Letters Patent No. 104,673, dated June 21, 1870.

---

IMPROVEMENT IN STREET-CAR STARTERS.

---

The Schedule referred to in these Letters Patent and making part of the same.

---

*To all whom it may concern:*

Be it known that I, HILYARD WELCH, of Schuylersville, in the county of Saratoga and in the State of New York, have invented certain new and useful Improvements in an Attachment of a Lever to a Horse or Steam-Car, horses or steam attached to the lever; and do hereby declare that the following is a full, clear, and exact description thereof, reference being had to the accompanying drawing and to the letters of reference marked thereon making a part of this specification.

The nature of my invention consists in the construction and arrangement of a device to be attached to railroad cars, whether horse or steam, for the purpose of facilitating the starting of said cars.

In order to enable others skilled in the art to which my invention appertains to make and use the same, I will now proceed to describe its construction and operation, referring to the annexed drawing, in which—

Figure 1:
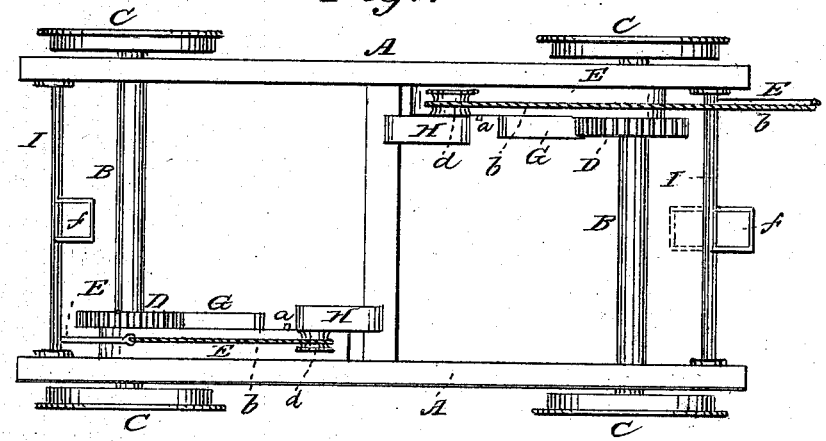
Figure 1 is a plan view of a car-frame with my device attached.
Figure 2:
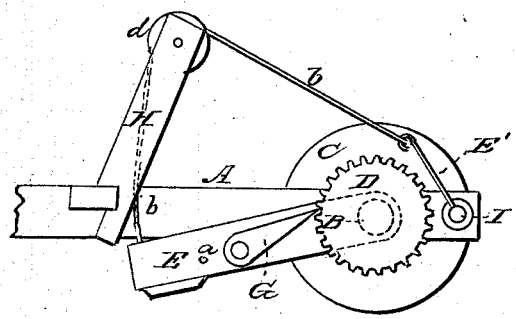
Figure 2 is a vertical section of one end of the same.

A represents the frame of a railroad car, of which B B are the axles, and C C the wheels.

Upon the axle B is secured a toothed wheel D, and between said wheel and the frame, on the axle, is placed a lever, E, which moves freely up and down, that is, revolves on the axle, while the axle is permitted to turn freely in the lever.

On the inner side of the lever E is pivoted a pawl, G, which gears with the toothed wheel D on the rear side, and can be thrown out of gear by being turned over against the pin *a* on the lever.

From the rear end of the lever E a cord or chain, *b*, passes upward around a pulley, *d*, on the side of a standard, H, which is firmly secured to the frame A, and extends up under the seat of the car.

This cord or chain *b*, after passing around the pulley *d*, is attached to a lever, *e*, secured to a shaft, I, in the end of the car-frame.

At the center of the shaft I is a loop, *f*, through which the tongue is passed and suitably secured.

When the car stops, the team being backed, the loop *f* turns backward, causing the lever E to drop down as far as the chain *b* will permit. Then, when the car is to be started, it will readily be seen that, before the power of the team is applied to the car, the shaft I will be partially turned forward.

Through the means of the lever *e* and cord *b*, the lever E is raised up, causing the pawl H to turn the wheel D, axle B, and wheels C C, thus actually starting the car before the power of the horses comes in operation, or it will at least assist the horses in starting the car.

This device may also be used on railroad cars by attaching the lever *e* in some suitable manner to the draw-head or bumper.

I am aware that the several devices herein shown and described, when taken separately, are of themselves not new.

What I claim is—

The arrangement, under the car-seat, of the wheel D, pawl G, lever E, cord or chain *b*, standard H, and pulley *d*, in combination with the rock-shaft I, with lever *e* and bail *f*, all constructed to operate as set forth.

In testimony that I claim the foregoing, I have hereunto set my hand and seal this 18th day of December, 1869.

HILYARD WELCH. [L. S.]

Witnesses:
ROBERT HERMANCE,
GEO. W. DEMICK.